(12) United States Patent
Zhou

(10) Patent No.: US 10,856,149 B2
(45) Date of Patent: *Dec. 1, 2020

(54) CROSS-DEVICE LOGIN TO IMPROVE SERVICE EFFICIENCY

(71) Applicant: Alibaba Group Holding Limited, George Town (KY)

(72) Inventor: Qi Zhou, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,913

(22) Filed: Feb. 13, 2020

(65) Prior Publication Data

US 2020/0187002 A1 Jun. 11, 2020

Related U.S. Application Data

(63) Continuation of application No. 16/384,592, filed on Apr. 15, 2019, now Pat. No. 10,602,358, which is a
(Continued)

(30) Foreign Application Priority Data

Dec. 21, 2016 (CN) .......................... 2016 1 1193702

(51) Int. Cl.
*H04W 12/06* (2009.01)
*H04W 12/00* (2009.01)
(Continued)

(52) U.S. Cl.
CPC ............ *H04W 12/06* (2013.01); *H04B 11/00* (2013.01); *H04L 63/0815* (2013.01);
(Continued)

(58) Field of Classification Search
CPC .. H04B 11/00; H04W 12/003; H04W 12/002; H04W 12/06; H04L 63/0815;
(Continued)

(56) References Cited

U.S. PATENT DOCUMENTS 9,940,930 B1\* 4/2018 Campbell ............... G06F 3/167
10,602,358 B2\* 3/2020 Zhou ...................... H04B 11/00
(Continued)

FOREIGN PATENT DOCUMENTS

CN 103067378 4/2013
CN 103905200 7/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Brandon J Miller
(74) *Attorney, Agent, or Firm* — Fish & Richardson P.C.

(57) ABSTRACT

A server receives a login request from a first device. The login request includes login information used for an application login. In response to receiving the login request from the first device, the server transmits, to a second device different from the first device, a first message including a verification code. The first message instructs the second device to broadcast an audio signal including the verification code. The verification code is used to verify the first device by the server.

20 Claims, 10 Drawing Sheets

Related U.S. Application Data continuation of application No. PCT/CN2017/115401, filed on Dec. 11, 2017.

(51) Int. Cl.
*H04L 29/06* (2006.01)
*H04B 11/00* (2006.01)

(52) U.S. Cl.
CPC .......... *H04L 63/0853* (2013.01); *H04L 63/18* (2013.01); *H04W 12/002* (2019.01); *H04W 12/003* (2019.01); *H04L 63/083* (2013.01); *H04L 2463/082* (2013.01)

(58) Field of Classification Search
CPC ................. H04L 63/0853; H04L 63/18; H04L 2463/082; H04L 63/083
See application file for complete search history.

(56) References Cited

U.S. PATENT DOCUMENTS

| | | | |
|---|---|---|---|
| 2008/0098225 A1* | 4/2008 | Baysinger | H04L 63/083 713/171 |
| 2011/0219427 A1 | 9/2011 | Hito et al. | |
| 2015/0004935 A1* | 1/2015 | Fu | H04W 12/08 455/411 |
| 2015/0089613 A1 | 3/2015 | Tippett et al. | |
| 2015/0215299 A1 | 7/2015 | Burch et al. | |
| 2015/0234624 A1 | 8/2015 | Nii et al. | |
| 2015/0327069 A1 | 11/2015 | Fu | |
| 2016/0072803 A1 | 3/2016 | Holz | |
| 2016/0234221 A1* | 8/2016 | Junuzovic | H04L 63/08 |
| 2016/0352751 A1* | 12/2016 | Perrufel | H04L 63/0876 |
| 2019/0246273 A1 | 8/2019 | Zhou | |

FOREIGN PATENT DOCUMENTS

| | | |
|---|---|---|
| CN | 103945380 | 7/2014 |
| CN | 104144058 | 11/2014 |
| CN | 105450614 | 3/2016 |
| CN | 106921650 | 7/2017 |
| EP | 2482575 | 8/2012 |
| JP | 2015170277 | 9/2015 |
| KR | 20160051495 | 5/2016 |
| TW | 201145962 | 12/2011 |

OTHER PUBLICATIONS

Extended European Search Report in European Application No. 17882375.3, dated Sep. 23, 2019, 8 pages.
International Search Report and Written Opinion issued in International Application No. PCT/CN2017/115401 dated Feb. 24, 2018, 9 pages (with English translation).
Kumparak, Techrunch.com [online], "SlickLogin Aims to Kill the Password by Signing a Silent Song to Your Smartphone," Sep. 2013, retrieved on Sep. 23, 2019, retrieved from URL<https://techcrunch.com/2013/09/09/slicklogin-wants-to-kill-the-password-by-singing-a-silent-song-to-your-smartphone/>, 16 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/115401, dated Jun. 25, 2019, 14 pages (with English translation).
PCT Written Opinion of the International Searching Authority in International Application No. PCT/CN2017/115401, dated Feb. 24, 2018, 9 pages (with English translation).
Extended European Search Report in European Application No. 20189032.4, dated Sep. 14, 2020, 10 pages.

* cited by examiner

CROSS-DEVICE LOGIN TO IMPROVE SERVICE EFFICIENCY

CROSS-REFERENCE TO RELATED APPLICATIONS

This application is a continuation of U.S. patent application Ser. No. 16/384,592, filed on Apr. 15, 2019, which is a continuation of PCT Application No. PCT/CN2017/115401, filed on Dec. 11, 2017, which claims priority to Chinese Patent Application No. 201611193702.1, filed on Dec. 21, 2016, and each application is hereby incorporated by reference in its entirety.

TECHNICAL FIELD

The present disclosure relates to the communications field, and in particular, to a method, a system, and an apparatus for cross-device login.

BACKGROUND

Currently, users can perform cross-device login by using mobile phones. An existing method for cross-device login by using a mobile phone mainly includes the following: A user scans a two-dimensional code by using the mobile phone, and logs in based on the two-dimensional code; or an SMS verification code is sent to the mobile phone, and then the user logs in based on the SMS verification code; or a voice verification code is sent to the mobile phone, and then a user is authorized based on the voice verification code.

In the existing cross-device login method, secondary user intervention is needed, and consequently login is not intelligent enough. For example, in the login method based on code scanning, the user needs to operate the mobile phone, open a code scanning page on the mobile phone, and then scan a two-dimensional code. For another example, in the login method based on an SMS verification code or a voice verification code, the user needs to enter a verification code on a login page after receiving the verification code.

SUMMARY

The present disclosure provides a method, a system, and an apparatus for cross-device login, to prevent secondary user intervention in an existing cross-device login method.

To achieve the described objective, the present disclosure provides a method for cross-device login, including the following: sending, by a device to be authorized, a login request to a server, where the login request includes login information used for application login; sending, by the server to an authorized device, a verification code used to verify the device to be authorized, where the authorized device is a device that logs in by using the login information and that is authorized by the server; broadcasting, by the authorized device, an audio signal, where the audio signal includes at least the verification code; obtaining, by the device to be authorized, the verification code from the audio signal after sensing the audio signal, and sending the verification code to the server for verification; and allowing, by the server, the device to be authorized to log in after the verification succeeds.

To achieve the described objective, the present disclosure provides another method for cross-device login, including the following: sending a login request to a server, where the login request includes login information used for application login; sensing an audio signal that is broadcast by an authorized device, where the audio signal includes at least a verification code, and the authorized device is a device that logs in by using the login information and that is authorized by the server; obtaining the verification code from the audio signal after the audio signal is sensed; and sending the verification code to the server for verification.

To achieve the described objective, the present disclosure provides another method for cross-device login, including the following: receiving a login request sent by a device to be authorized, where the login request includes login information used for application login; and sending, to an authorized device, a verification code used to verify the device to be authorized, so that the authorized device encodes the verification code into an audio signal for broadcasting, where the authorized device is a device that logs in by using the login information and that is authorized by a server.

To achieve the described objective, the present disclosure provides a method for cross-device login, including the following: receiving a verification code that is sent by a server to verify a device to be authorized; encoding the verification code into an audio signal; and broadcasting the audio signal, so that the device to be authorized senses the audio signal.

To achieve the described objective, the present disclosure provides a system for cross-device login, including the following: a device to be authorized, configured to send a login request to a server, sense an audio signal that is broadcast by an authorized device; obtain a verification code used for verification from the audio signal after sensing the audio signal, and send the verification code to the server for verification, where the login request includes login information used for application login, and the authorized device is a device that logs in by using the login information and that is authorized by the server; the server, configured to send, to the authorized device, the verification code used to verify the device to be authorized, verify the verification code, and allow the device to be authorized to log in after the verification succeeds; and the authorized device, configured to receive the verification code, and encode the verification code into the audio signal for broadcasting, where the audio signal includes at least the verification code.

To achieve the described objective, the present disclosure provides an apparatus for cross-device login, including the following: a sending module, configured to send a login request to a server; a sensing module, configured to sense an audio signal that is broadcast by an authorized device, where the audio signal includes at least a verification code; an acquisition module, configured to obtain the verification code from the audio signal after the audio signal is sensed; and a verification module, configured to send the verification code to the server for verification, where the login request includes login information used for application login, and the authorized device is a device that logs in by using the login information and that is authorized by the server.

To achieve the described objective, the present disclosure provides an apparatus for cross-device login, including the following: a receiving module, configured to receive a login request sent by a device to be authorized; and a sending module, configured to send, to an authorized device, a verification code used to verify the device to be authorized, so that the authorized device encodes the verification code into an audio signal for broadcasting, where the login request includes login information used for application login, and the authorized device is a device that logs in by using the login information and that is authorized by a server.

To achieve the described objective, the present disclosure provides an apparatus for cross-device login, including the following: a receiving module, configured to receive a verification code that is sent by a server to verify a device to be authorized; an encoding module, configured to encode the verification code into an audio signal; and a broadcasting module, configured to broadcast the audio signal, so that the device to be authorized senses the audio signal.

According to the method, the system, and the apparatus for cross-device login provided in the present disclosure, the device to be authorized sends the login request to the server; the server sends, to the authorized device, the verification code used to verify the device to be authorized; the authorized device broadcasts the audio signal, where the audio signal includes at least the verification code; the device to be authorized obtains the verification code from the audio signal after sensing the audio signal, and sends the verification code to the server for verification; and the server allows the device to be authorized to log in after the verification succeeds. In the present disclosure, after the device to be authorized initiates the login request, an authorized device near the device to be authorized can receive the verification code; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

DESCRIPTION OF IMPLEMENTATIONS

With reference to the accompanying drawings, the following describes in detail a method, a system, and an apparatus for cross-device login provided in the implementations of the present disclosure.

Implementation 1

Figure 1:
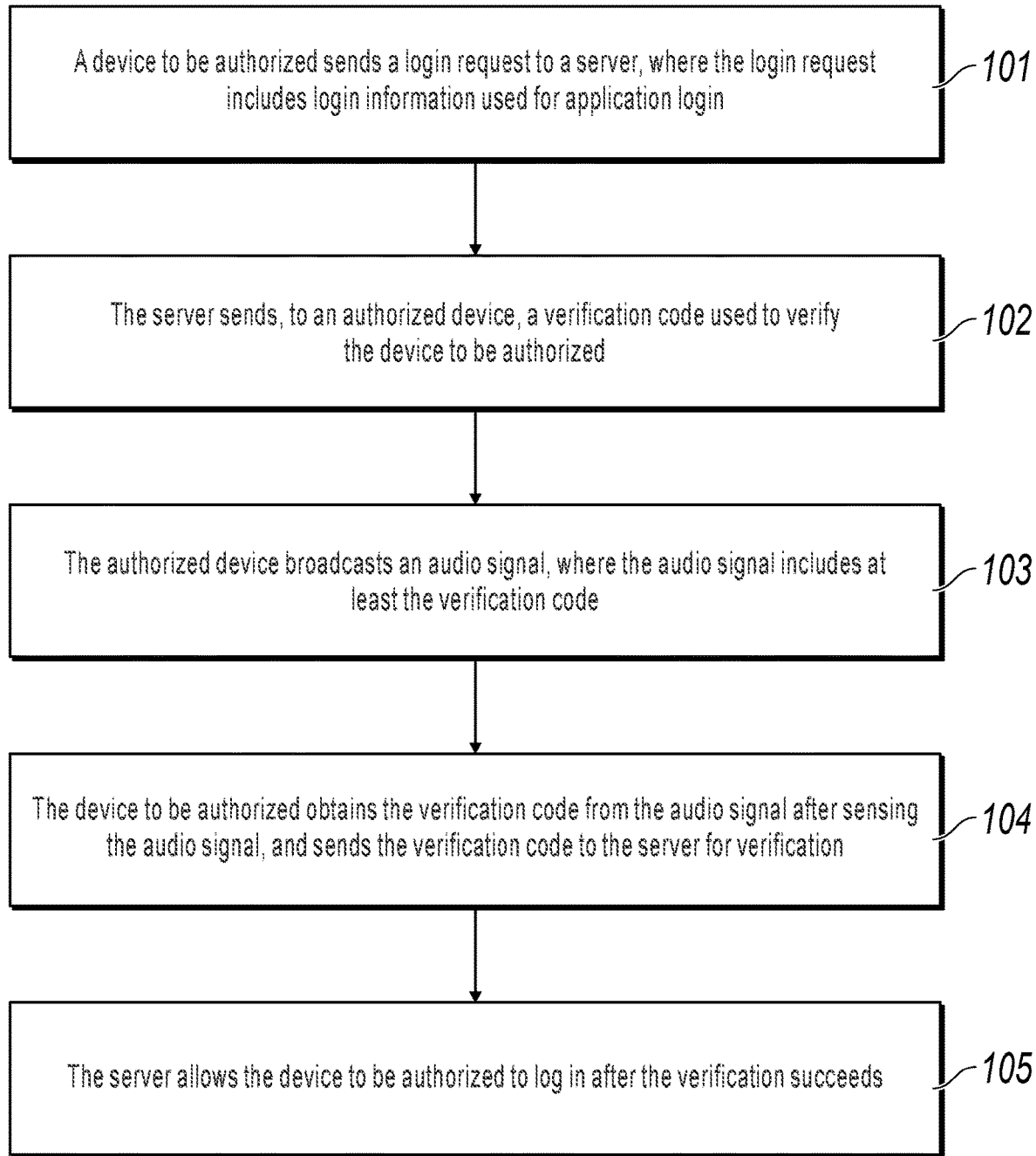
FIG. 1 is a schematic flowchart illustrating a method for cross-device login, according to Implementation 1 of the present disclosure.

FIG. 1 is a schematic flowchart illustrating a method for cross-device login, according to Implementation 1 of the present disclosure. As shown in FIG. 1, the method for cross-device login includes the following steps.

S101. A device to be authorized sends a login request to a server, where the login request includes login information used for application login.

When a user attempts to log in to a certain application on the device to be authorized, the device to be authorized needs to send a login request to a server corresponding to the application, to request the server to allow the device to be authorized to log in to the application, so that the device to be authorized is authorized to use the application. The login request includes at least the login information used for application login. The login information is preferably a login account. In practice, the device to be authorized usually can choose to remember the login account after the user logs in to the application for the first time by using the device to be authorized. As such, when the user uses the login account to log in to the application on the device to be authorized again, the user can directly select the login account from all login accounts stored on the device to be authorized, thereby reducing user intervention.

Optionally, to reduce user intervention, before the device to be authorized sends the login request to the server, the method further includes the following: paging, by the device to be authorized, nearby devices through sound waves; after a nearby authorized device responds to the paging sent by the device to be authorized, sending, by the authorized device, login information to the device to be authorized; and adding, by the device to be authorized, the login information to the login request, and sending the login request to the server.

Optionally, the login information is information including an account feature that can identify an authorization capability, for example, an association feature or a superset of the login account.

The login request can further include information such as a device identifier, a model, and a login request sending time of the device to be authorized.

S102. The server sends, to an authorized device, a verification code used to verify the device to be authorized.

The authorized device is a device that logs in by using the login information and that is authorized by the server.

To log in to the device to be authorized safely, the server usually needs to generate, after receiving the login request, the verification code used to verify the device to be authorized. Preferably, the verification code can be a random number generated by the server. In the present implementation, another device logging in to the server by using the login information corresponding to the device to be authorized such as the login account can be referred to as the authorized device here. To implement cross-device login of the device to be authorized, the server sends, to the authorized device, the verification code used to verify the device to be authorized, to forward the verification code to the device to be authorized by using the authorized device. In other words, in the present implementation, the device to be authorized logs in to the server across authorized devices.

S103. The authorized device broadcasts an audio signal, where the audio signal includes at least the verification code.

To implement full-automatic login, the authorized device adds the verification code to the audio signal after receiving the verification code sent by the server, and then broadcasts the audio signal to the device to be authorized. The authorized device can encode the verification code into the audio signal according to an encoding rule agreed on with the server, and then broadcast, based on near-field acoustic communication, the audio signal to the device to be authorized.

In practice, because the authorized device broadcasts the audio signal to the device to be authorized, to sense the audio signal, a distance between the device to be authorized and the authorized device needs to be within coverage of a transmission distance of the broadcast audio signal.

S104. The device to be authorized obtains the verification code from the audio signal after sensing the audio signal, and sends the verification code to the server for verification.

In the present implementation, the device to be authorized can obtain the audio signal through sensing, and can decode the audio signal according to the encoding rule of the audio signal after sensing the audio signal, to obtain the verification code. Optionally, the encoding rule of the audio signal can be sent in advance to the device to be authorized by the server.

Further, the device to be authorized sends the verification code to the server for verification after obtaining the verification code.

S105. The server allows the device to be authorized to log in after the verification succeeds.

After receiving the verification code sent by the device to be authorized, the server can compare the verification code with the verification code generated by the server in S102. If two verification codes are the same, it indicates that the device to be authorized can be authorized, and the server allows the device to be authorized to log in. As such, the device to be authorized is authorized to use the application.

For example, when the user logs in to a certain application on a mobile phone and needs to log in to the application on another setting such as a computer, the user can send a login request to a server corresponding to the application by using the computer; then the server sends a verification code to the authorized mobile phone; the mobile phone encodes the verification code into an audio signal, and then broadcasts the audio signal to the computer; the computer senses the audio signal by using a microphone, obtains the verification code from the audio signal, and then sends the verification code to the server for verification; and the server allows the computer to log in to the application after the verification succeeds. Generally, a distance between the computer and the mobile phone needs to be within coverage of a transmission distance of the broadcast audio signal.

According to the method for cross-device login provided in the present implementation, the device to be authorized sends the login request to the server; the server sends, to the authorized device, the verification code used to verify the device to be authorized; the authorized device broadcasts the audio signal to the device to be authorized, where the audio signal includes at least the verification code; the device to be authorized obtains the verification code, and sends the verification code to the server for verification; and the server allows the device to be authorized to log in after the verification succeeds. In the present implementation, after the device to be authorized initiates the login request to the server, an authorized device near the device to be authorized can receive the verification code sent by the server; then the authorized device broadcasts the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Implementation 2

Figure 2:
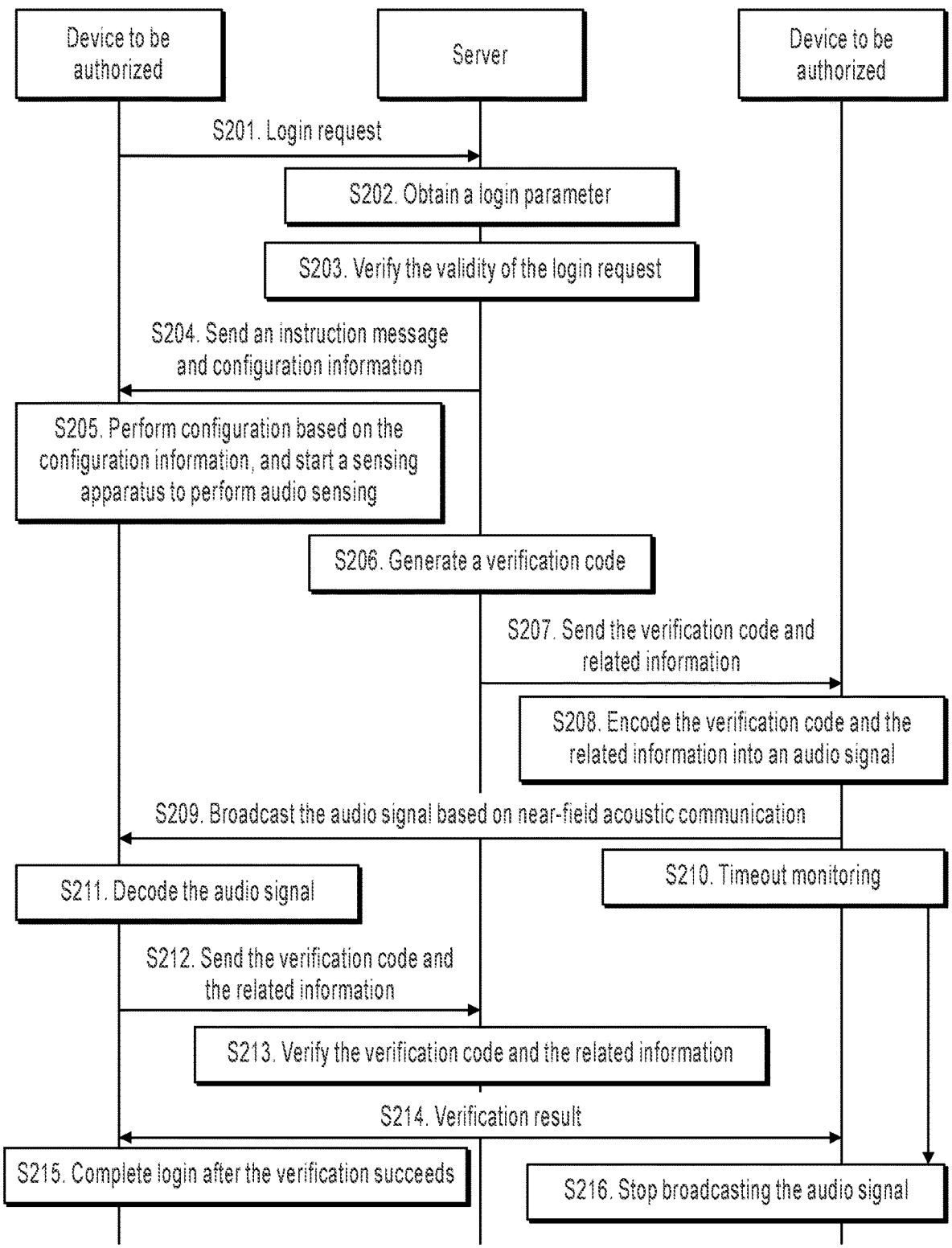
FIG. 2 is a schematic flowchart illustrating a method for cross-device login, according to Implementation 2 of the present disclosure.

FIG. 2 is a schematic flowchart illustrating a method for cross-device login, according to Implementation 2 of the present disclosure. As shown in FIG. 2, the method for cross-device login includes the following steps.

S201. A device to be authorized sends a login request to a server.

For a specific process, references can be made to description of related content in the described implementation. Details are omitted here for simplicity.

S202. The server processes the login request to obtain a login parameter from the login request.

The server can parse the login request, and obtain the login parameter from the login request. The login parameter can include a login account and a login time.

S203. The server verifies the validity of the login request based on the login parameter.

The server can determine whether the login account and the login time are valid. If the login account is valid, it indicates that the login account has been registered with the server. In practice, all login requests have a time limit. After the time limit expires, the server does not process the login request. In the present implementation, the server needs to determine whether the login time is within a valid period; and in response to determining that the login time is within the valid period, the server can continue to process the login request, in other words, the server can continue to perform a next operation.

If all the login parameters are valid parameters, S204 is performed.

S204. The server sends an instruction message and configuration information to the device to be authorized, where the instruction message is used to instruct the device to be authorized to perform audio sensing.

The server can send the instruction message to the device to be authorized. The instruction message is used to instruct the device to be authorized to start a sensing apparatus of the device to be authorized, and perform audio sensing by using the sensing apparatus. The sensing apparatus can be a microphone (Mic) device, and audio sensing is performed by using the microphone.

Further, the server can send the configuration information to the device to be authorized while sending the instruction message. The configuration information can include an encoding rule of an audio signal to be sensed, so that the device to be authorized senses the audio signal and decodes the audio signal according to the encoding rule.

The configuration information can further include a request number corresponding to the login request sent by the device to be authorized. When a plurality of devices to be authorized send login requests to the server simultaneously, to prevent interference, the server can number the login requests after receiving all the login requests, then add request numbers to the configuration information, and send the configuration information to the device to be authorized, so that the device to be authorized can identify whether the received audio signal matches the login request sent by the device to be authorized.

S205. The device to be authorized performs configuration based on the configuration information, and starts a sensing apparatus to perform audio sensing.

S206. The server generates a verification code.

After instructing the device to be authorized to perform audio sensing, the server can generate the verification code used to verify the device to be authorized. Preferably, the verification code is a random number.

S207. The server sends the verification code and related information to the authorized device through an authorized channel.

The authorized device is a device that logs in by using the login account and that is authorized by the server.

There is an authorized channel between the server and the authorized device. The authorized channel is a downlink communication link established between the server and the authorized device. After receiving the login request, the server can identify the authorized device by using the downlink communication link. The server obtains, by using the login account in the login request, the authorized device having an online login account, and then sends the verification code to the authorized device through the downlink communication link.

In the present implementation, some related information can be sent while the verification code is sent to the authorized device. The related information includes the encoding rule for encoding the audio signal, and can further include the request number corresponding to the login request.

S208. The authorized device encodes the verification code and the related information into an audio signal.

The authorized device can encode the verification code into the audio signal according to the received encoding rule. Optionally, the related information can be added to the audio signal, for example, a device identifier of the authorized device and the request number corresponding to the login request.

S209. The authorized device broadcasts the audio signal based on near-field acoustic communication.

In the present implementation, the authorized device can broadcast the audio signal based on near-field acoustic communication, so that the device to be authorized senses the audio signal. To enable the device to be authorized to sense the audio signal, the device to be authorized should be within coverage of the broadcast the audio signal.

S210. The authorized device performs timeout monitoring on sensing of the device to be authorized.

In the present implementation, after sending the audio signal, the authorized device can monitor, based on a predetermined time interval, the device to be authorized, to ensure the validity of the verification code. The authorized device monitors whether the device to be authorized senses the audio signal within the predetermined time interval. In the present implementation, the device to be authorized can feed back a sensing completion indication to the authorized device after sensing the audio signal, and the authorized device can receive the sensing completion indication within the predetermined time interval. If the authorized device fails to receive the sensing completion indication within the predetermined time interval, it indicates that sensing fails. If the authorized device does not monitor, within the predetermined time interval, that the device to be authorized senses the audio signal, the authorized device returns a timeout indication to the server. As such, the authorized device performs step S216 to stop broadcasting the audio signal.

S211. The device to be authorized decodes the sensed audio signal.

After sensing the audio signal, the device to be authorized can decode the audio signal according to the encoding rule in the configuration information, and obtain the verification code from the audio signal. Optionally, the audio signal can further include the related information, for example, the request number of the login request.

There are many encoding rules for the audio signal. A segment of signals with different frequencies represent one code, and then some start-stop flag bits, etc. are added to implement encoding. For example, it can be set that a sine wave of 1500 Hz corresponds to 1, a sine wave of 1600 Hz corresponds to 2, and a sine wave of 1700 Hz corresponds to 3. As such, a digital string 3123 corresponds to four sine waves. If it is specified that each sine wave lasts 100 ms, 3123 corresponds to a voice segment of 400 milliseconds. The device to be authorized records the audio signal by using the sensing apparatus, parses the received audio signal, identifies four sine wave frequencies: 1700 Hz, 1500 Hz, 1600 Hz, and 1700 Hz, and then searches a codebook. A number obtained through decoding is 3123.

S212. The device to be authorized sends the verification code and the related information to the server for verification.

S213. The server verifies the verification code and the related information.

The device to be authorized can send the verification code and the related information to the server for verification. The server determines whether the request number extracted from the audio signal is consistent with a request number corresponding to the locally stored login request; and in response to determining that the request number extracted from the audio signal is consistent with the request number corresponding to the locally stored login request, the server verifies the verification code. In other words, the server determines whether the received verification code is consistent with a verification code that corresponds to the login request locally stored in the server; and in response to determining that the received verification code is consistent with the verification code that corresponds to the login request locally stored in the server, it indicates that the verification succeeds.

Optionally, after the related information includes the device identifier of the authorized device, the server can further identify the device identifier, and determine whether the authorized device identified by the device identifier is a legal device authorized by the server.

In another implementation of determining the consistency of request numbers, the server can add the request number corresponding to the login request to the configuration information when sending the configuration information to the device to be authorized. As such, after extracting the request number from the audio signal, the device to be authorized determines whether the request number is consistent with the request number in the configuration information. In response to determining that the request number is consistent with the request number in the configuration information, the device to be authorized sends the verification code to the server for verification.

Further, after obtaining a verification result the server can send the verification result to the authorized device and the device to be authorized.

S214. The server sends login completion a verification result to the device to be authorized and the authorized device.

S215. The device to be authorized logs in after the verification succeeds.

S216. The authorized device stops broadcasting the audio signal.

In the present implementation, after the device to be authorized initiates the login request to the server, an authorized device near the device to be authorized can receive the verification code sent by the server; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Further, when a plurality of devices to be authorized initiate a plurality of login requests to the server simultaneously, the server can send different encoding information to different devices to be authorized, and correspondingly set a request number for one login request of each device to be authorized, thereby preventing interference.

Implementation 3

Figure 3:
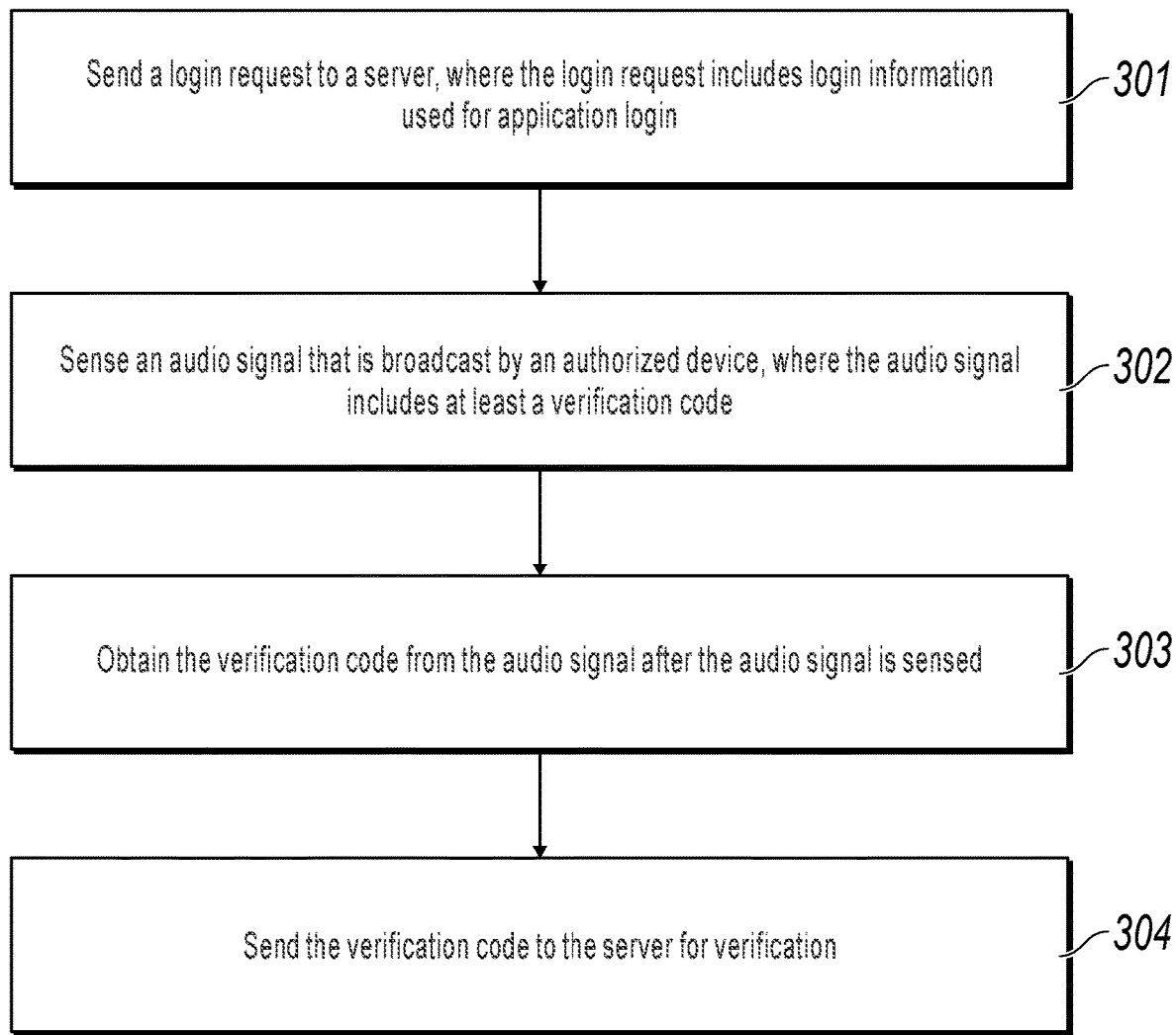
FIG. 3 is a schematic flowchart illustrating a method for cross-device login, according to Implementation 3 of the present disclosure.

FIG. 3 is a schematic flowchart illustrating a method for cross-device login, according to Implementation 3 of the present disclosure. As shown in FIG. 3, the method for cross-device login includes the following steps.

S301. Send a login request to a server, where the login request includes login information used for application login.

In the present implementation, the method for cross-device login is performed by a device to be authorized. When a user attempts to log in to a certain application on the device to be authorized, the device to be authorized sends a login request to a server corresponding to the application, to request the server to allow the device to be authorized to log in to the application, so that the device to be authorized is authorized to use the application. The login request includes at least a login account. Optionally, the login request can further include information such as a device identifier, a model, and a login request sending time of the device to be authorized.

S302. Sense an audio signal that is broadcast by an authorized device, where the audio signal includes at least a verification code.

The authorized device is a device that logs in by using the login information and that is authorized by the server.

After the login request is sent to the server, the server can send, to the authorized device, the verification code used to verify the device to be authorized. The authorized device can encode the verification code into the audio signal. The device to be authorized can start a sensing apparatus such as a microphone, to sense the audio signal that is broadcast by the authorized device. The audio signal includes at least the verification code.

Optionally, the audio signal can further include related information such as a request number corresponding to the login request or a device identifier of the authorized device.

Before sensing the audio signal that is broadcast by the authorized device, the device to be authorized can receive an instruction message sent by the server, and the instruction message is used to instruct the device to be authorized to perform audio sensing.

Optionally, when receiving the instruction message, the device to be authorized can further receive configuration information sent by the server, and the configuration information includes an encoding rule of the audio signal.

S303. Obtain the verification code from the audio signal after the audio signal is sensed.

After sensing the audio signal, the device to be authorized decodes the audio signal according to the encoding rule in the configuration information, and obtains the verification code from the audio signal.

Optionally, when the audio signal includes related information such as an encoding request corresponding to the login request and/or a device identifier of the authorized device, the device to be authorized can extract the related information from the decoded audio signal.

S304. Send the verification code to the server for verification.

To complete login authentication, the device to be authorized sends the verification code to the server for verification after obtaining the verification code.

The device to be authorized can further send the related information extracted from the audio signal to the server for verification. The server can compare a request number in the related information with a request number of the locally stored login request, to determine whether two request numbers are consistent, thereby improving the login security, preventing mutual interference between a plurality of devices to be authorized, and improving the validity of authorization authentication.

Optionally, the configuration information received by the device to be authorized can further include a request number corresponding to the login request. The request number extracted from the audio signal by the device to be authorized is compared with a request number in the configuration information, to determine whether two request numbers are consistent.

In the present implementation, after the device to be authorized initiates the login request to the server, an authorized device near the device to be authorized can receive the verification code sent by the server; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Further, when a plurality of devices to be authorized initiate a plurality of login requests to the server simultaneously, the server can send different encoding information to different devices to be authorized, and correspondingly set a request number for one login request of each device to be authorized, thereby preventing interference.

Implementation 4

Figure 4:
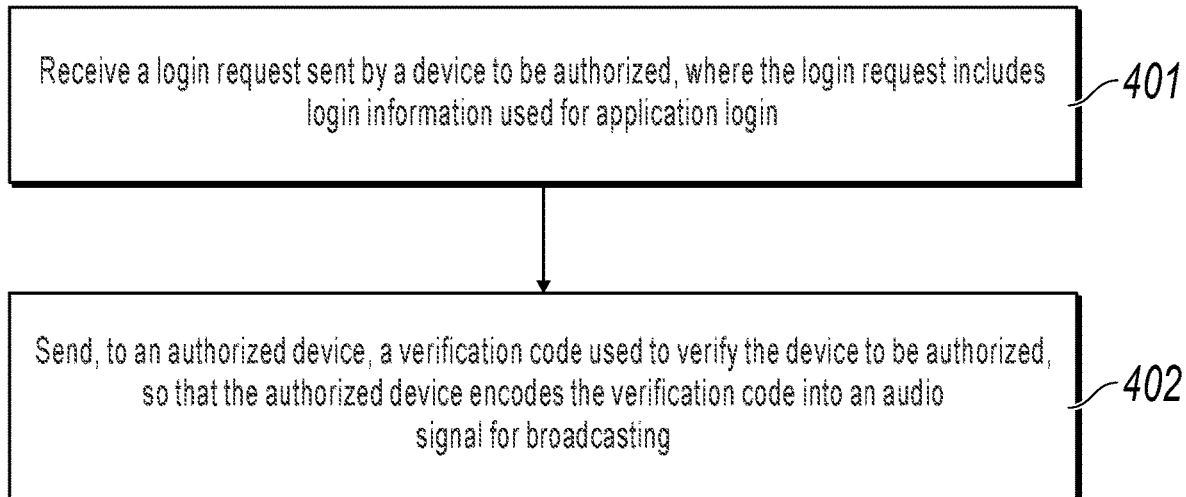
FIG. 4 is a schematic flowchart illustrating a method for cross-device login, according to Implementation 4 of the present disclosure.

FIG. 4 is a schematic flowchart illustrating a method for cross-device login, according to Implementation 4 of the present disclosure. As shown in FIG. 4, the method for cross-device login includes the following steps.

S401. Receive a login request sent by a device to be authorized, where the login request includes login information used for application login.

In the present implementation, the method for cross-device login is performed by a server.

For related description of the login request, references can be made to description of related content in the described implementation. Details are omitted here for simplicity.

Further, login parameters can be obtained from the login request after the login request is obtained, such as a login account and a login time. The server can verify the validity of these login parameters. For a specific verification process, references can be made to description of related content in the described implementation. Details are omitted here for simplicity.

Further, after the verification succeeds, the server sends, to the device to be authorized, an instruction message for performing audio sensing, and sends configuration information to the device to be authorized. The configuration information includes at least an encoding rule of an audio signal. Optionally, the configuration information can further include a request number corresponding to the login request.

S402. Send, to an authorized device, a verification code used to verify the device to be authorized, so that the authorized device encodes the verification code into an audio signal for broadcasting.

The authorized device is a device that logs in by using the login information and that is authorized by the server.

The server generates the verification code used to verify the device to be authorized, where the verification code can be a random number; and sends the verification code to the authorized device through an authorized channel established between the server and the authorized device.

The server can further send some related information to the authorized device while sending the verification code, such as the request number corresponding to the login request, and the encoding rule of the audio signal.

Further, the server receives the verification code sent by the device to be authorized, and verifies the verification code. Optionally, when receiving the verification code, the server can further receive related information sent by the device to be authorized, for example, the request number extracted from the audio signal and a device identifier of the authorized device. The server can further verify the related information sent by the device to be authorized, thereby improving the authorization security, and preventing mutual interference between a plurality of devices to be authorized. For a process of verifying the verification code and related information by the server, references can be made to description of related content in the described implementation. Details are omitted here for simplicity.

Further, after obtaining a verification result, the server can send the verification result to the authorized device and the device to be authorized. After the verification succeeds, the server allows the device to be authorized to log in.

In the present implementation, after the device to be authorized initiates the login request to the server, an authorized device near the device to be authorized can receive the verification code sent by the server; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Further, when a plurality of devices to be authorized initiate a plurality of login requests to the server simultaneously, the server can send different encoding information to different devices to be authorized, and correspondingly set a request number for one login request of each device to be authorized, thereby preventing interference.

Implementation 5

Figure 5:
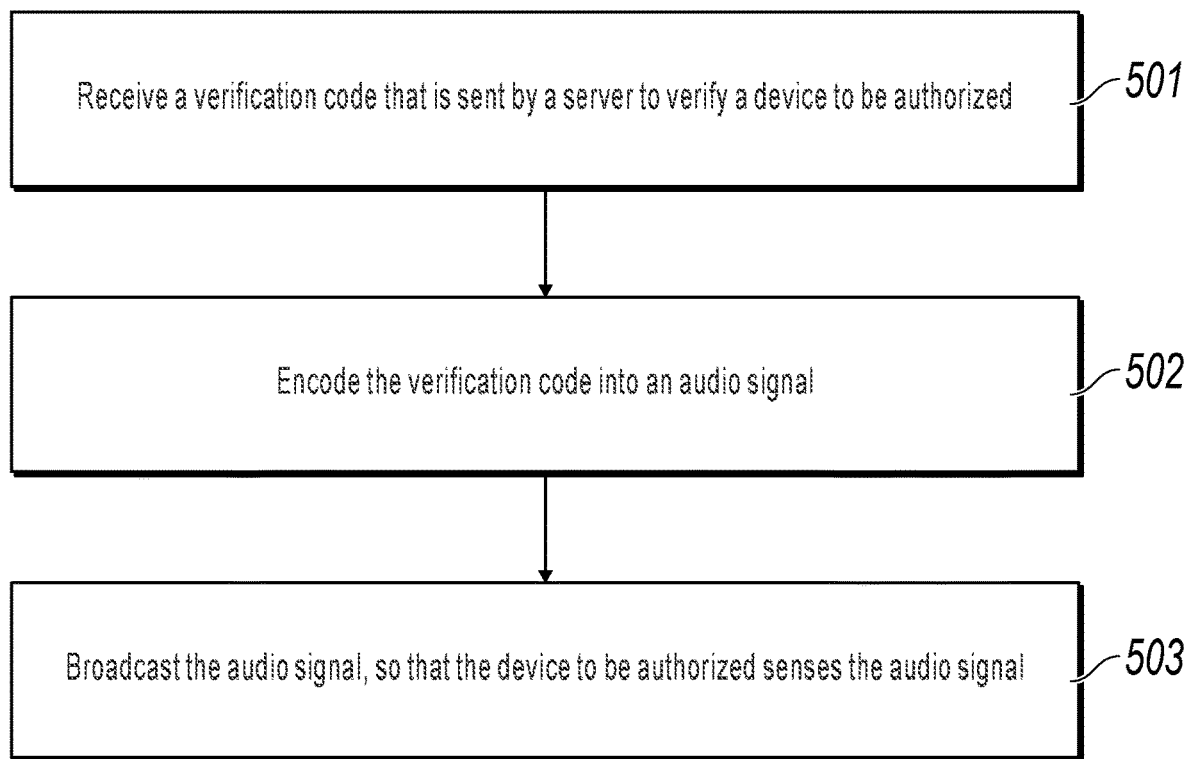
FIG. 5 is a schematic flowchart illustrating a method for cross-device login, according to Implementation 5 of the present disclosure.

FIG. 5 is a schematic flowchart illustrating a method for cross-device login, according to Implementation 5 of the present disclosure. As shown in FIG. 5, the method for cross-device login includes the following steps.

S501. Receive a verification code that is sent by a server to verify a device to be authorized.

In the present implementation, the method for cross-device login is performed by an authorized device. The authorized device is a device that is authorized by the server and that logs in by using login information in a login request sent by the device to be authorized.

After the authorized device is authorized by the server, an authorized channel is established between the authorized device and the server, and the authorized device receives, through the authorized channel, the verification code sent by the server. For a process of generating the verification code by the server, references can be made to description of related content in the described implementation. Details are omitted here for simplicity.

S502. Encode the verification code into an audio signal.

After the verification code is obtained, the authorized device can encode the verification code into the audio signal according to an agreed-on encoding rule. The encoding rule can be sent by the server to the authorized device.

The audio signal can further include a device identifier of the authorized device and a request number corresponding to the login request. The verification code and the request number that corresponds to the login request can be simultaneously sent by the server.

S503. Broadcast the audio signal, so that the device to be authorized senses the audio signal.

After the audio signal is obtained through encoding, the authorized device can broadcast, based on near-field acoustic communication, the audio signal to the device to be authorized, so that the device to be authorized senses the audio signal.

Optionally, after broadcasting the audio signal, the authorized device can perform timeout monitoring on sensing of the device to be authorized; and after monitoring expires, stop broadcasting the audio signal. For a specific monitoring process, references can be made to description of related content in the described implementation. Details are omitted here for simplicity.

In the present implementation, after the device to be authorized initiates the login request to the server, an authorized device near the device to be authorized can receive the verification code sent by the server; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Further, when a plurality of devices to be authorized initiate a plurality of login requests to the server simultaneously, the server can send different encoding information to different devices to be authorized, and correspondingly set a request number for one login request of each device to be authorized, thereby preventing interference.

Implementation 6

Figure 6:
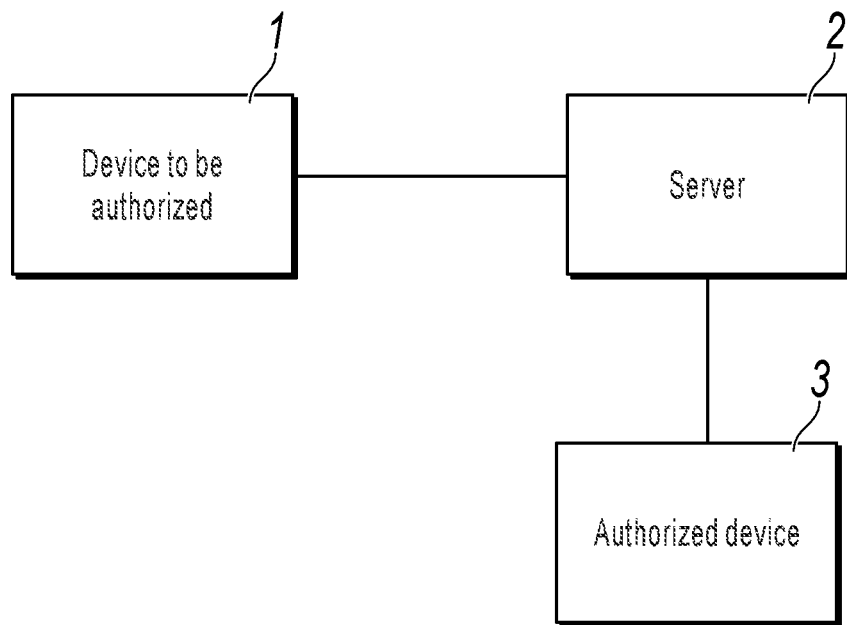
FIG. 6 is a schematic structural diagram illustrating a system for cross-device login, according to Implementation 6 of the present disclosure.

FIG. 6 is a schematic structural diagram illustrating a system for cross-device login, according to Implementation 6 of the present disclosure. As shown in FIG. 6, the system for cross-device login includes a device 1 to be authorized, a server 2, and an authorized device 3.

The device 1 to be authorized is configured to send a login request to the server 2; sense an audio signal that is broadcast by the authorized device 3; obtain a verification code used for verification from the audio signal after sensing the audio signal; and send the verification code to the server 2 for verification. The login request includes login information used for application login, and the authorized device 3 is a device that logs in by using the login information and that is authorized by the server 2.

The server 2 is configured to send, to the authorized device 3, the verification code used to verify the device 1 to be authorized; verify the verification code; and allow the device 1 to be authorized to log in after the verification succeeds.

The authorized device 3 is configured to receive the verification code, and encode the verification code into the audio signal for broadcasting.

Before sending, to the authorized device 2, the verification code used to verify the device 1 to be authorized, the server 2 is further configured to instruct the device 1 to be authorized to perform audio sensing.

The server 2 is further configured to generate the verification code; and send the verification code to the authorized device 3 through an authorized channel between the server 2 and the authorized device 3.

The authorized device 3 is further configured to encode the verification code into the audio signal; and broadcast the audio signal based on near-field acoustic communication.

The authorized device 3 is further configured to monitor, after broadcasting the audio signal based on near-field acoustic communication, whether the device 1 to be authorized senses the audio signal within a predetermined time interval; and return a timeout indication to the server 2 if the authorized device does not monitor, within the predetermined time interval, that the device 1 to be authorized senses the audio signal.

The server 2 is further configured to send configuration information to the device 1 to be authorized, where the configuration information includes an encoding rule of the audio signal.

The device 1 to be authorized is further configured to decode the audio signal according to the encoding rule; obtain the verification code; and send the verification code to the server 2 for verification.

The audio signal further includes a request number corresponding to the login request. As such, the device 1 to be authorized is further configured to extract the request number from the audio signal; determine whether the request number extracted from the audio signal is consistent with a request number in the configuration information; and in response to determining that the request number extracted from the audio signal is consistent with the request number in the configuration information, send the verification code to the server for verification.

The audio signal further includes a request number corresponding to the login request. As such, the device 1 to be authorized is further configured to extract the request number from the audio signal; and send the request number to the server 2.

The server 2 is further configured to determine whether the request number extracted from the audio signal is consistent with the request number corresponding to the locally stored login request; and in response to determining that the request number extracted from the audio signal is consistent with the request number corresponding to the locally stored login request, verify the received verification code.

The server 2 is further configured to send the encoding rule to the authorized device when sending the verification code to the authorized device 3 through the authorized channel.

The audio signal further includes a device identifier of the authorized device 3.

In the present implementation, after the device to be authorized initiates the login request to the server, an authorized device near the device to be authorized can receive the verification code sent by the server; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Further, when a plurality of devices to be authorized initiate a plurality of login requests to the server simultaneously, the server can send different encoding information to different devices to be authorized, and correspondingly set a request number for one login request of each device to be authorized, thereby preventing interference.

Implementation 7

Figure 7:
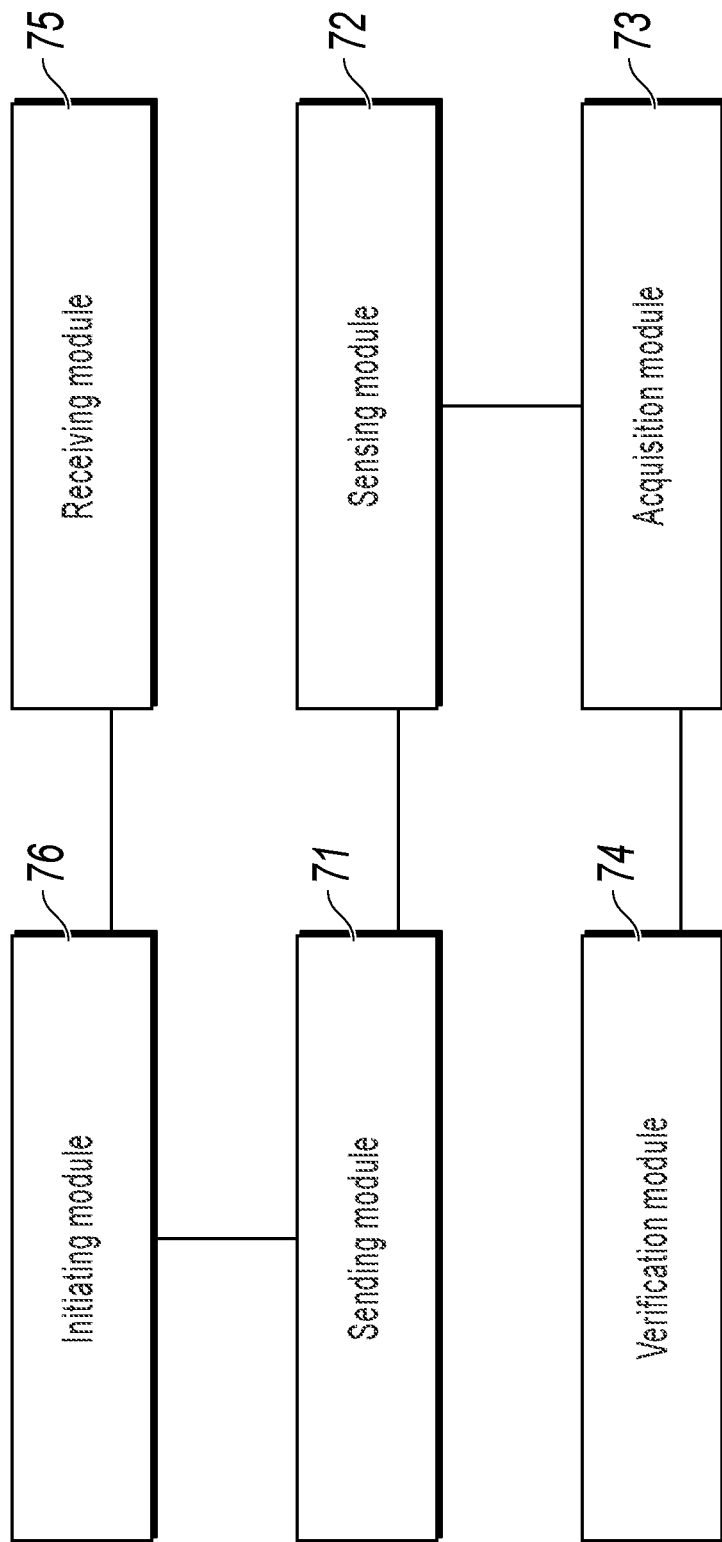
FIG. 7 is a schematic structural diagram illustrating an apparatus for cross-device login, according to Implementation 7 of the present disclosure.

FIG. 7 is a schematic structural diagram illustrating an apparatus for cross-device login, according to Implementation 7 of the present disclosure. As shown in FIG. 7, the apparatus for cross-device login includes a sending module 71, a sensing module 72, an acquisition module 73, and a verification module 74.

The sending module 71 is configured to send a login request to a server.

The sensing module 72 is configured to sense an audio signal that is broadcast by an authorized device, where the audio signal includes at least a verification code.

The acquisition module 73 is configured to obtain the verification code from the audio signal after the audio signal is sensed.

The verification module 74 is configured to send the verification code to the server for verification.

The login request includes login information used for application login, and the authorized device is a device that logs in by using the login information and that is authorized by the server.

The apparatus for cross-device login further includes a receiving module 75 and an initiating module 76.

The receiving module 75 is configured to receive an instruction message that is sent by the server to instruct to perform audio sensing.

The initiating module is configured to start a sensing apparatus according to the instruction message to perform audio sensing.

The receiving module 75 is further configured to receive, when receiving the instruction message, configuration information sent by the server, where the configuration information includes an encoding rule of the audio signal.

The acquisition module 73 is further configured to decode the audio signal according to the encoding rule, to obtain the verification code.

The configuration information further includes a request number corresponding to the login request. As such, the verification module is configured to extract a request number from the audio signal; determine whether the request number extracted from the audio signal is consistent with the request number in the configuration information; and in response to determining that the request number extracted from the audio signal is consistent with the request number in the configuration information, send the verification code to the server for verification.

The audio signal further includes a request number corresponding to the login request. As such, the verification module 74 is further configured to: when sending the verification code to the server for verification, send the request number extracted from the audio signal to the server for verification.

The apparatus for cross-device login provided in the present implementation is disposed on a device to be authorized. The device to be authorized and the authorized device can be interchangeable with each other. As such, the apparatus for cross-device login provided in the present implementation can also be disposed on the authorized device.

In the present implementation, after the device to be authorized initiates the login request to the server, an authorized device near the device to be authorized can receive the verification code sent by the server; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Further, when a plurality of devices to be authorized initiate a plurality of login requests to the server simultaneously, the server can send different encoding information to different devices to be authorized, and correspondingly set a request number for one login request of each device to be authorized, thereby preventing interference.

Implementation 8

Figure 8:
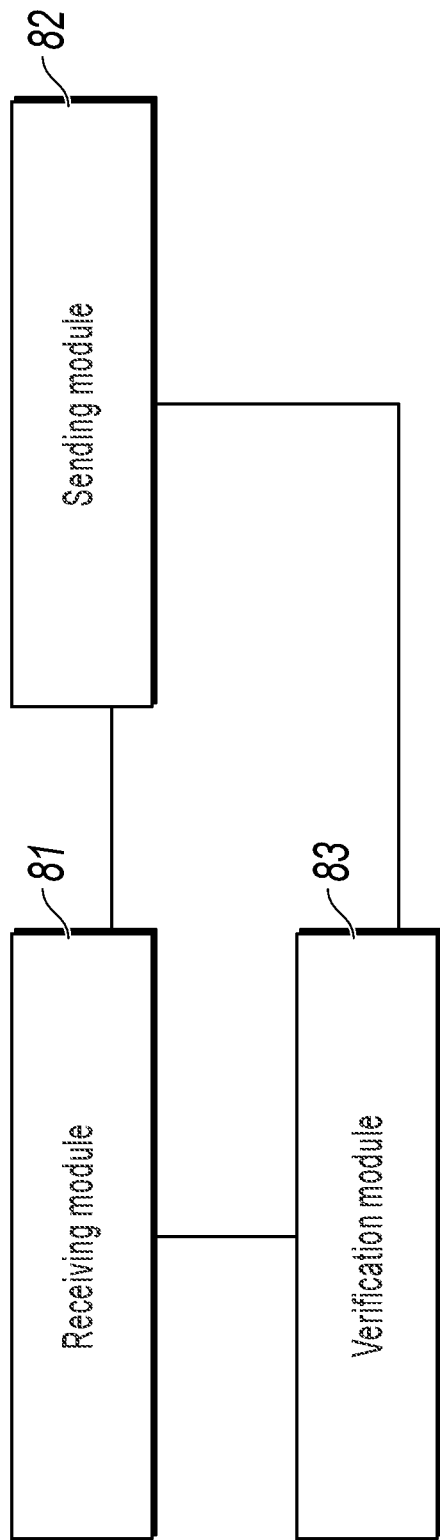
FIG. 8 is a schematic structural diagram illustrating an apparatus for cross-device login, according to Implementation 8 of the present disclosure.

FIG. 8 is a schematic structural diagram illustrating an apparatus for cross-device login, according to Implementation 8 of the present disclosure. As shown in FIG. 8, the apparatus for cross-device login includes a receiving module 81 and a sending module 82.

The receiving module 81 is configured to receive a login request sent by a device to be authorized.

The sending module 82 is configured to send, to an authorized device, a verification code used to verify the device to be authorized, so that the authorized device encodes the verification code into an audio signal for broadcasting.

The login request includes login information used for application login, and the authorized device is a device that logs in by using the login information and that is authorized by a server.

The sending module 82 is further configured to send the verification code to the authorized device through an authorized channel between the server and the authorized device.

The apparatus for cross-device login further includes the following: a verification module 83, configured to: before sending, to the authorized device, the verification code used to verify the device to be authorized, verify the validity of the login request based on a login parameter included in the login request, where the login parameter includes at least a login account and a login time.

The sending module 82 is further configured to: when the login request is valid, send an instruction message to the device to be authorized, where the instruction message is used to instruct the device to be authorized to perform audio sensing.

The sending module 82 is further configured to: when sending the instruction message to the device to be authorized, send configuration information to the device to be authorized, where the configuration information includes an encoding rule of the audio signal.

The audio signal further includes a request number corresponding to the login request.

The receiving module 81 is further configured to receive the verification code sent by the device to be authorized and the request number extracted from the audio signal.

The verification module 83 is further configured to verify the verification code and the request number that is extracted from the audio signal.

The sending module 82 is further configured to send a verification result to the device to be authorized and the authorized device.

The apparatus for cross-device login provided in the present implementation is disposed on the server.

In the present implementation, after the device to be authorized initiates the login request to the server, an authorized device near the device to be authorized can receive the verification code sent by the server; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Further, when a plurality of devices to be authorized initiate a plurality of login requests to the server simultaneously, the server can send different encoding information to different devices to be authorized, and correspondingly set a request number for one login request of each device to be authorized, thereby preventing interference.

Implementation 9

Figure 9:
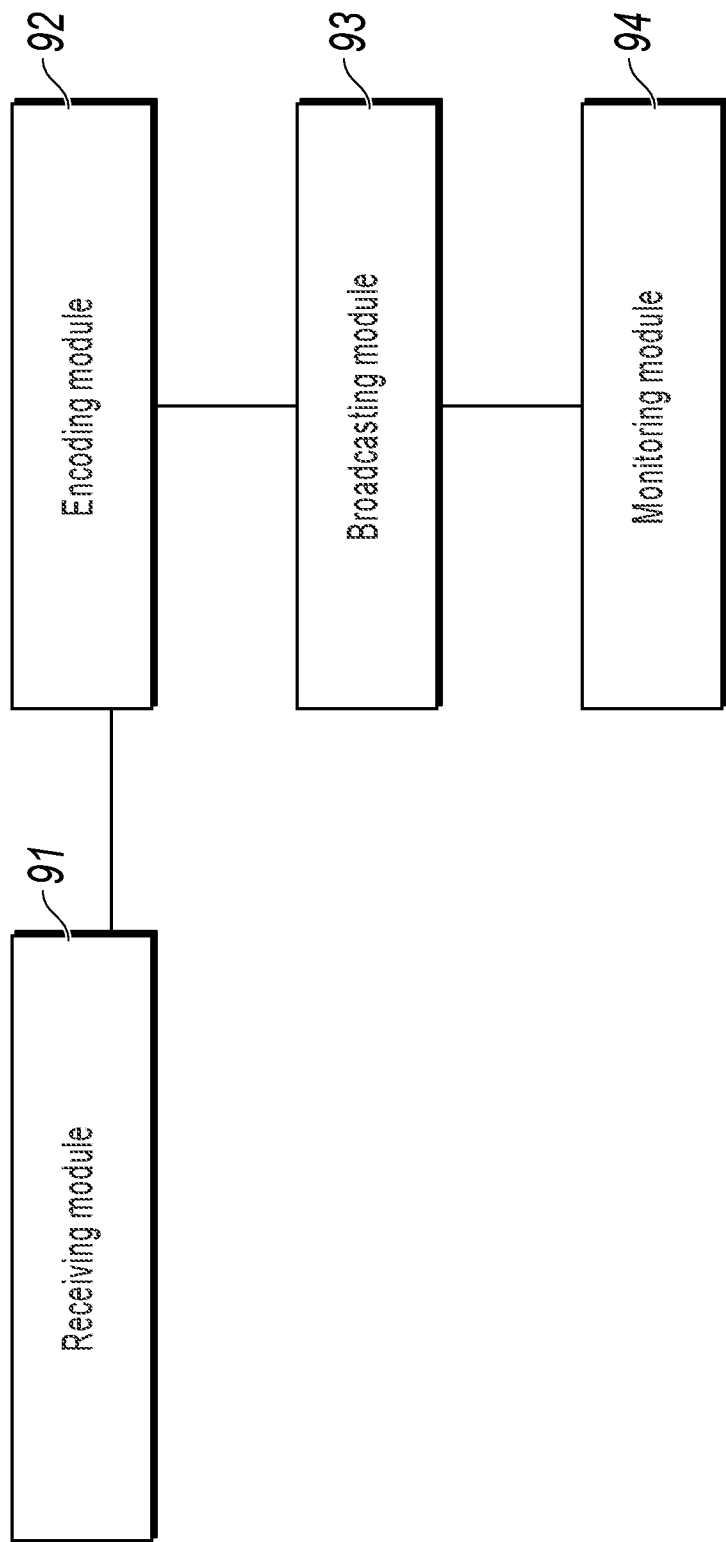
FIG. 9 is a schematic structural diagram illustrating an apparatus for cross-device login, according to Implementation 9 of the present disclosure.

FIG. 9 is a schematic structural diagram illustrating an apparatus for cross-device login, according to Implementation 9 of the present disclosure. As shown in FIG. 9, the apparatus for cross-device login includes a receiving module 91, an encoding module 92, and a broadcasting module 93.

The receiving module 91 is configured to receive a verification code that is sent by a server to verify a device to be authorized.

The encoding module 92 is configured to encode the verification code into an audio signal.

The broadcasting module 93 is configured to broadcast the audio signal, so that the device to be authorized senses the audio signal.

The apparatus for cross-device login further includes the following: a monitoring module 94, configured to monitor, after the audio signal is broadcast, whether the device to be authorized senses the audio signal within a predetermined time interval; and return a timeout indication to the server if the monitoring module does not monitor, within the predetermined time interval, that the device to be authorized senses the audio signal.

The receiving module 91 is further configured to receive, when receiving the verification code, an encoding rule of the audio signal sent by the server.

The audio signal further includes a device identifier of the authorized device.

The apparatus for cross-device login provided in the present implementation is disposed on the authorized device. Because the device to be authorized and the authorized device can be interchangeable with each other, the apparatus for cross-device login provided in the present implementation can also be disposed on the device to be authorized.

Because the device to be authorized and the authorized device can be interchangeable with each other, the device to be authorized and the authorized device can be simultaneously provided with the apparatuses for cross-device login provided in Implementation 7 to Implementation 9.

In the present implementation, after the device to be authorized initiates the login request to the server, an authorized device near the device to be authorized can receive the verification code sent by the server; then the authorized device broadcasts, based on near-field acoustic communication, the audio signal including the verification code; and the device to be authorized extracts the verification code from the sensed audio signal, and automatically sends the verification code to the server for verification, thereby implementing more intelligent cross-device login authentication without secondary user intervention, reducing authorization costs, and improving operation efficiency and user experience.

Further, when a plurality of devices to be authorized initiate a plurality of login requests to the server simultaneously, the server can send different encoding information to different devices to be authorized, and correspondingly set a request number for one login request of each device to be authorized, thereby preventing interference.

A person of ordinary skill in the art can understand that all or some of the steps of the method implementations can be implemented by a program instructing relevant hardware. The program can be stored in a computer readable storage medium. When the program runs, the steps of the method implementations are performed. The described storage medium includes: any medium that can store program code, such as a ROM, a RAM, a magnetic disk, or an optical disc.

Finally, it is worthwhile to note that the described implementations are merely intended to describe the technical solutions of the present disclosure, but not to limit the present disclosure. Although the present disclosure is described in detail with reference to the described implementations, a person of ordinary skill in the art should understand that modifications can be still made to the technical solutions described in the described implementations or equivalent replacements can be made to some or all technical features of the technical solutions, without departing from the scope of the technical solutions of the implementations of the present disclosure.

Figure 10:
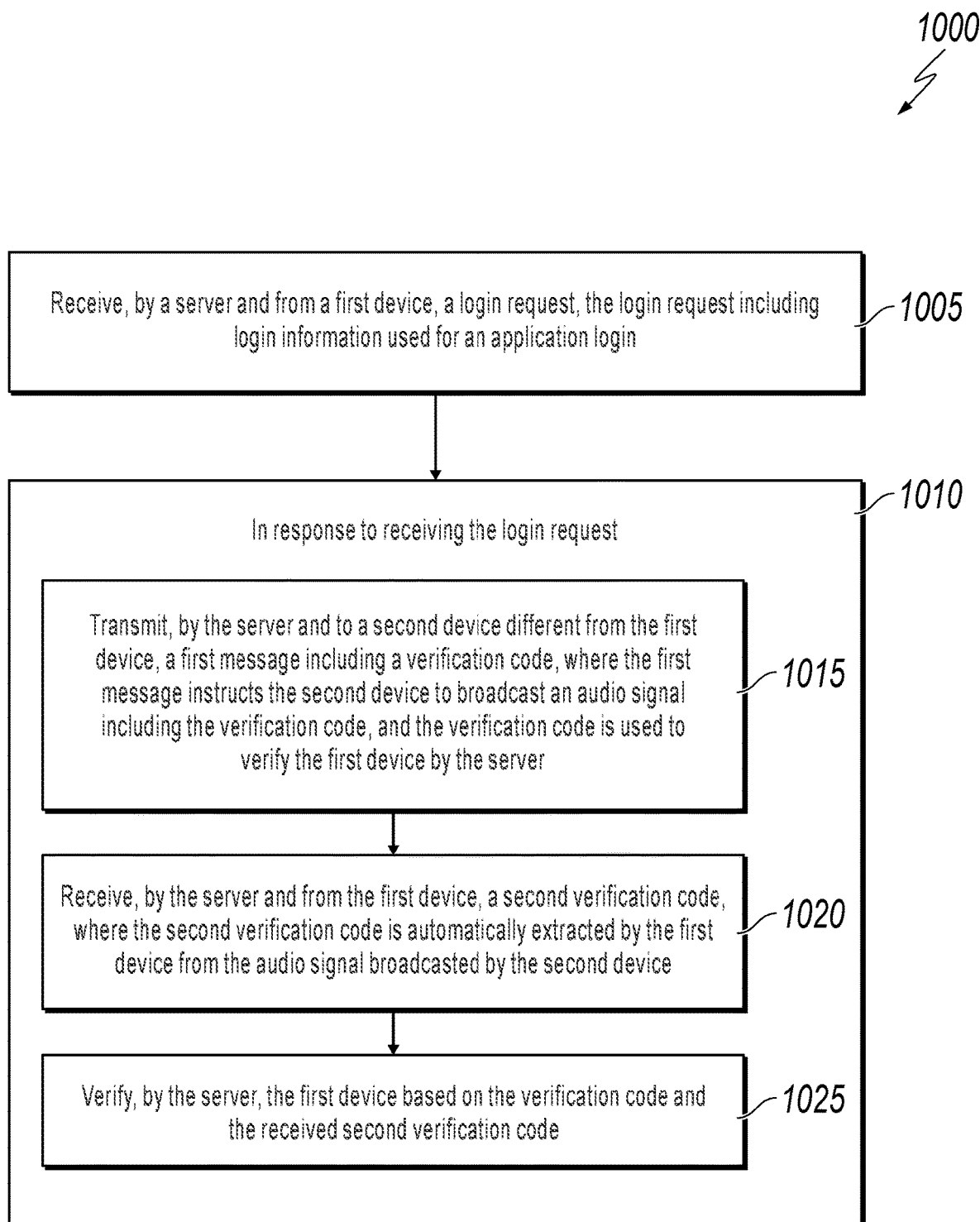
FIG. 10 is a flowchart illustrating an example of a computer-implemented method for cross-device login, according to an implementation of the present disclosure.

FIG. 10 is a flowchart illustrating an example of a computer-implemented method 1000 for cross-device login, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1005, a login request is received by a server from a first device. The login request includes login information used for an application login. In some implementations, the first device is a device to be authorized by the server (such as, an unauthorized device that has not been authorized by the server). The login request is for cross-device login by the unauthorized first device. For example, the user has already logged into the application on another device. In some implementations, the first device can be, for example, a smartphone, a laptop, or a tablet. The application can be a mobile application (APP) installed on, for example, a mobile device, or a Web application installed on, for example, a personal computer (PC). In some implementations, the login information can include, for example, a login account, a login time, or both. For example, when a user logs into an application on a mobile phone and later attempts to log into the same application on a computer (that is, the first device), the computer can transmit a cross-device login request to a server. In some implementations, the user does not need to perform further operations before the login process is completed. For example, the first device automatically completes the cross-device login without secondary user intervention (such as, user entering a verification code or clicking on a login button on the first device). From 1005, method 1000 proceeds to 1010.

At 1010, in response to receiving the login request, steps 1015, 1020, and 1025 can be automatically performed. From 1010, method 1000 proceeds to 1015.

At 1015, a first message including a verification code (or a validation code) is transmitted by the server to a second device different from the first device. The verification code is used to verify the first device by the server. For example, the verification code is not transmitted to the first device directly. In some implementations, the first message instructs the second device to broadcast an audio signal including the verification code based on, for example, near-field acoustic communication. Other forms of signal can be used (such as, an optical signal), as appropriate. In some implementations, the second device is an authorized device by the server. For example, the user has used the login information to successfully log into the application on the second device. In some implementations, the second device can be, for example, a smartphone, a laptop, or a tablet. In some implementations, the second device is located near the first device. For example, the server can determine one or more authorized devices based on at least one of the login information and a distance to the location of the first device (such as, within 1 meter (m) of the first device). In some implementations, the server can determine the second device from the one or more authorized devices. For example, the second device can be an authorized device that is closest to the first device, or an authorized device that the user last used to log into the application.

In some implementations, a determination is made by the second device as to whether the first device senses the audio signal within a predetermined time period (such as, 1 minute). If it is determined that the first device does not sense the audio signal within the predetermined time period, a timeout indication associated with the verification code is transmitted by the second device to the server.

In some implementations, the first message is transmitted by the server to the second device through an authorized channel between the server and the second device. In some cases, the first message can include an encoding rule, and the second device encodes, based on the encoding rule, the verification code into the audio signal for broadcasting. For example, the encoding rule can define codes based on frequencies and one or more start-stop flags. In some implementations, the audio signal can include a device identifier of the second device. In some implementations, the first message is pushed by the server to the second device through a push channel.

In some implementations, the server generates the verification code after receiving the login request from the first device. For example, the verification code can include a random number generated by the server. In some cases, the server can determine whether the login account and the login time in the login information are valid. If the server determines that the login account and the login time in the login information are valid, the server can generate the verification code and transmit to the second device. However, if the server determines that at least one of the login account and the login time in the login information is not valid, the server will not process the login request. For example, steps 1015, 1020, and 1025 will not be performed.

In some implementations, in addition to transmitting the first message to the second device, a second message is transmitted, by the server to the first device, to instruct the first device to perform audio sensing. For example, the second message can instruct the first device to enable a microphone of the first device. In some implementations, after receiving the second message, the first device can enable the microphone and start listening for audio signal. In some cases, the second message can include an encoding rule that the first device can use to decode the received audio signal from the second device. In some implementations, the server can assign a request number associated with the login request. For example, the request number can be included in the first message, the second message, or both. With the request number, the first device can determine whether the received audio signal matches the login request sent by the first device. In some implementations, if the received audio signal matches the login request sent by the first device, the first device can extract the verification code from the received audio signal. However, if the received audio signal does not match the login request sent by the first device, the first device can discard the received audio signal and listen for audio signal that match the login request sent by the first device. From 1015, method 1000 proceeds to 1020.

At 1020, a second verification code is received by the server and from the first device. The second verification code is automatically extracted by the first device from the audio signal broadcasted by the second device. For example, if the verification code is encoded in the audio signal by the second device, the first device can automatically decode the received audio signal based on the received encoding rule to obtain the second verification code. From 1020, method 1000 proceeds to 1025.

At 1025, the first device is verified by the server based on the verification code and the received second verification code. In some implementations, after the first device extracts the second verification code from the audio signal, the first device automatically transmits the second verification to the server for authentication. For example, a determination is made by the server as to whether the received second verification code matches the verification code. In some implementations, if it is determined that the received second verification code matches the verification code, the first device is verified by the server, and the application login on the first device is authorized by the server. Otherwise, if it is determined that the received second verification code does not match the verification code, the first device is not verified by the server, and the application login on the first device is denied by the server.

In some implementations, a request number is transmitted along with the second verification code to the server. For example, a determination is first made by the server as to whether the received request number matches the request number stored at the server and associated with the login request. In some implementations, if it is determined that the received request number matches the request number stored at the server and associated with the login request, the server then verifies the received second verification code as previously described. Otherwise, if it is determined that the received request number does not match the request number stored at the server and associated with the login request, the server will not process to verify the received second verification code. After 1025, method 1000 can stop.

Cross-device login can be performed by a user using a mobile device. Normally, the user first opens an application on the mobile device, and then uses the mobile device to scan a two-dimensional code to complete the cross-device login. In some cases, the user first receives an SMS verification code or a voice verification code on the mobile device, and then enters the received verification code on a login page displayed on the mobile device to complete the cross-device login. However, secondary user intervention (such as, user entering a verification code or clicking on a login button) may be needed during cross-device login, which is not convenient for the user. The subject matter described in this specification provides a simple and automatic cross-device login method without secondary user intervention. For example, an authorized device near the mobile device can receive the verification code from a server, and broadcast audio signal including the verification code based on near-field acoustic communication. Then, the mobile device can extract the verification code from the sensed audio signal, and automatically send the verification code to the server for verification. In doing so, secondary user intervention may not be needed during cross-device login. As a result, intelligent cross-device login authentication can be implemented, thereby improving cross-device login efficiency and user experience.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a server and from a first device, a login request, wherein the login request includes login information used for an application login;
   in response to receiving the login request from the first device, transmitting, by the server and to a second device different from the first device, a first message including a verification code, wherein the first message instructs the second device to broadcast an audio signal including the verification code, and the verification code is used to verify the first device by the server;
   determining, by the second device, whether the first device senses the audio signal within a predetermined time period; and
   in response to determining that the first device does not sense the audio signal within the predetermined time period, transmitting, by the second device, a timeout indication associated with the verification code to the server.

2. The computer-implemented method of claim 1, wherein the first device is a device to be authorized by the server, the second device is an authorized device by the server, the server generates the verification code after receiving the login request from the first device, and the second device encodes, based on an encoding rule included in the first message received from the server, the verification code into the audio signal for broadcasting.

3. The computer-implemented method of claim 2, further comprising:
in response to receiving the login request from the first device, transmitting, by the server and to the first device, a second message instructing the first device to perform audio sensing;
receiving, by the server and from the first device, a second verification code, wherein the second verification code is automatically extracted and decoded by the first device from the audio signal broadcasted by the second device; and
verifying, by the server, the first device based on the verification code and the received second verification code.

4. The computer-implemented method of claim 3, wherein the second message instructs the first device to enable a microphone of the first device.

5. The computer-implemented method of claim 3, wherein verifying the first device comprises:
determining, by the server, whether the received second verification code matches the verification code; and
in response to determining that the received second verification code matches the verification code:
verifying, by the server, the first device; and
authorizing, by the server, the application login on the first device.

6. The computer-implemented method of claim 1, wherein the audio signal further includes a device identifier of the second device.

7. The computer-implemented method of claim 1, wherein the first message is transmitted by the server to the second device through an authorized channel between the server and the second device, and the audio signal is broadcasted by the second device based on near-field acoustic communication.

8. A non-transitory, computer-readable medium storing one or more instructions executable by a computer system to perform operations comprising:
receiving, by a server and from a first device, a login request, wherein the login request includes login information used for an application login;
in response to receiving the login request from the first device, transmitting, by the server and to a second device different from the first device, a first message including a verification code, wherein the first message instructs the second device to broadcast an audio signal including the verification code, and the verification code is used to verify the first device by the server;
determining, by the second device, whether the first device senses the audio signal within a predetermined time period; and
in response to determining that the first device does not sense the audio signal within the predetermined time period, transmitting, by the second device, a timeout indication associated with the verification code to the server.

9. The non-transitory, computer-readable medium of claim 8, wherein the first device is a device to be authorized by the server, the second device is an authorized device by the server, the server generates the verification code after receiving the login request from the first device, and the second device encodes, based on an encoding rule included in the first message received from the server, the verification code into the audio signal for broadcasting.

10. The non-transitory, computer-readable medium of claim 9, the operations further comprising:
in response to receiving the login request from the first device, transmitting, by the server and to the first device, a second message instructing the first device to perform audio sensing;
receiving, by the server and from the first device, a second verification code, wherein the second verification code is automatically extracted and decoded by the first device from the audio signal broadcasted by the second device; and
verifying, by the server, the first device based on the verification code and the received second verification code.

11. The non-transitory, computer-readable medium of claim 10, wherein the second message instructs the first device to enable a microphone of the first device.

12. The non-transitory, computer-readable medium of claim 10, wherein verifying the first device comprises:
determining, by the server, whether the received second verification code matches the verification code; and
in response to determining that the received second verification code matches the verification code:
verifying, by the server, the first device; and
authorizing, by the server, the application login on the first device.

13. The non-transitory, computer-readable medium of claim 8, wherein the audio signal further includes a device identifier of the second device.

14. The non-transitory, computer-readable medium of claim 8, wherein the first message is transmitted by the server to the second device through an authorized channel between the server and the second device, and the audio signal is broadcasted by the second device based on near-field acoustic communication.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a server and from a first device, a login request, wherein the login request includes login information used for an application login;
in response to receiving the login request from the first device, transmitting, by the server and to a second device different from the first device, a first message including a verification code, wherein the first message instructs the second device to broadcast an audio signal including the verification code, and the verification code is used to verify the first device by the server;
determining, by the second device, whether the first device senses the audio signal within a predetermined time period; and
in response to determining that the first device does not sense the audio signal within the predetermined time period, transmitting, by the second device, a timeout indication associated with the verification code to the server.

16. The computer-implemented system of claim 15, wherein the first device is a device to be authorized by the server, the second device is an authorized device by the server, the server generates the verification code after receiving the login request from the first device, and the second device encodes, based on an encoding rule included in the first message received from the server, the verification code into the audio signal for broadcasting.

17. The computer-implemented system of claim 16, the operations further comprising:

in response to receiving the login request from the first device, transmitting, by the server and to the first device, a second message instructing the first device to perform audio sensing;

receiving, by the server and from the first device, a second verification code, wherein the second verification code is automatically extracted and decoded by the first device from the audio signal broadcasted by the second device; and verifying, by the server, the first device based on the verification code and the received second verification code.

18. The computer-implemented system of claim 17, wherein the second message instructs the first device to enable a microphone of the first device.

19. The computer-implemented system of claim 17, wherein verifying the first device comprises:

determining, by the server, whether the received second verification code matches the verification code; and in response to determining that the received second verification code matches the verification code:
verifying, by the server, the first device; and
authorizing, by the server, the application login on the first device.

20. The computer-implemented system of claim 15, wherein the audio signal further includes a device identifier of the second device.

* * * * *